United States Patent
Helms et al.

(10) Patent No.: US 11,696,362 B2
(45) Date of Patent: Jul. 4, 2023

(54) DISABLING WIFI DISCONNECT ON INTERNET ENABLED APPLIANCES

(71) Applicant: Haier US Appliance Solutions, Inc., Wilmington, DE (US)

(72) Inventors: Chad Michael Helms, Louisville, KY (US); Abdelghani Elfarra, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/349,287

(22) Filed: Jun. 16, 2021

(65) Prior Publication Data
US 2022/0408516 A1  Dec. 22, 2022

(51) Int. Cl.
*H04W 76/30* (2018.01)
*H04W 76/10* (2018.01)
*H04L 12/28* (2006.01)
*H04W 84/12* (2009.01)

(52) U.S. Cl.
CPC ......... *H04W 76/30* (2018.02); *H04L 12/2803* (2013.01); *H04W 76/10* (2018.02); *H04L 2012/285* (2013.01); *H04W 84/12* (2013.01)

(58) Field of Classification Search
CPC ..... H04W 76/30; H04W 76/10; H04W 84/12; H04L 12/2803; H04L 2012/285
See application file for complete search history.

(56) References Cited

U.S. PATENT DOCUMENTS

| | | | |
|---|---|---|---|
| 8,463,448 B2 | 6/2013 | Burt | |
| 9,880,600 B2 * | 1/2018 | Shimizu | G01R 22/00 |
| 10,375,805 B2 | 8/2019 | De Jong | |
| 11,113,368 B2 * | 9/2021 | Seo | G06F 21/31 |
| 11,310,730 B2 * | 4/2022 | Huang | H04L 12/2838 |
| 2008/0020732 A1 | 1/2008 | Wu | |
| 2019/0191043 A1 * | 6/2019 | Tsuchiya | H04N 1/00506 |
| 2019/0280888 A1 | 9/2019 | Garschhammer | |
| 2021/0071347 A1 * | 3/2021 | Pattarello | D06F 58/34 |
| 2021/0127261 A1 * | 4/2021 | Helms | H04W 12/084 |

FOREIGN PATENT DOCUMENTS

| | | |
|---|---|---|
| AU | 2015203877 B2 | 12/2016 |
| JP | 2020123989 A | 8/2020 |

* cited by examiner

*Primary Examiner* — Kibrom T Hailu
(74) *Attorney, Agent, or Firm* — Dority & Manning, P.A.

(57) ABSTRACT

A method for operating an appliance, the appliance including a user interface and a wireless connection module. The method includes establishing a wireless connection between the appliance and a wireless network via the wireless connection module, determining that the appliance is communicating with a remote server via the wireless connection module in response to establishing the wireless connection, and disabling a disconnect button on the user interface for disconnecting the appliance from the wireless connection in response to determining the communication between the appliance and the remote server.

17 Claims, 3 Drawing Sheets

DISABLING WIFI DISCONNECT ON INTERNET ENABLED APPLIANCES

FIELD OF THE INVENTION

The present subject matter relates generally to appliances, and more particularly to methods for operating appliances having network capabilities.

BACKGROUND OF THE INVENTION

Appliances are utilized generally for a variety of tasks by a variety of users. For example, a household or business may include such appliances as laundry appliances, e.g., a washer and/or dryer, kitchen appliances, e.g., a refrigerator, a microwave, a dishwasher, and/or a coffee maker, along with room air conditioners and other various appliances. Some appliances can also include features for connecting to and communicating over a secure wireless network, such as a button, switch, knob, or the like. Such communication may provide connected features on the home appliances, e.g., where the home appliance communicates with a personal device, smart home systems, and/or a remote database such as a cloud server.

In some applications, connected appliances may be owned by a different person or persons from the actual users (e.g., at a laundromat, a rented house, or the like). In these cases, the owners of the appliances may be remotely located with respect to the appliances, sometimes states or countries away. Generally, these owners wish to retain control over the remote appliances, for a variety of reasons, such as maintenance, usage monitoring or control, or preventing malicious manipulation of the appliance. In one example, the appliance owner may wish to retain sole control over the ability to connect or disconnect from a wireless network. However, being remote from the appliance hinders the owner's ability to control users' physical interaction with the appliance (e.g., via a user interface).

Accordingly, a method for operating one or more appliances that obviates one or more of the above-mentioned drawbacks would be beneficial. Particularly, a method of operating a home appliance that allows remote control over certain features would be advantageous.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating an appliance is provided. The appliance may include a user interface and a wireless connection module. The method may include establishing a wireless connection between the appliance and a wireless network via the wireless connection module; determining that the appliance is communicating with a remote server via the wireless connection module in response to establishing the wireless connection; and preventing a local user from disconnecting the appliance from the wireless connection in response to determining the communication between the appliance and the remote server.

In another exemplary aspect of the present disclosure, an appliance is disclosed. The appliance may include a user interface comprising at least one network button for connecting to or disconnecting from a wireless network; a wireless connection module provided in the appliance and in communication with the user interface; and a controller provided in the appliance and in communication with the user interface and the wireless connection module. The controller may be configured for performing a series of operations, the series of operations including establishing a wireless connection between the appliance and a wireless network via the wireless connection module; determining that the appliance is communicating with a remote server via the wireless connection module in response to establishing the wireless connection; and disabling the network button on the user interface for disconnecting the appliance from the wireless connection in response to determining the communication between the appliance and the remote server.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
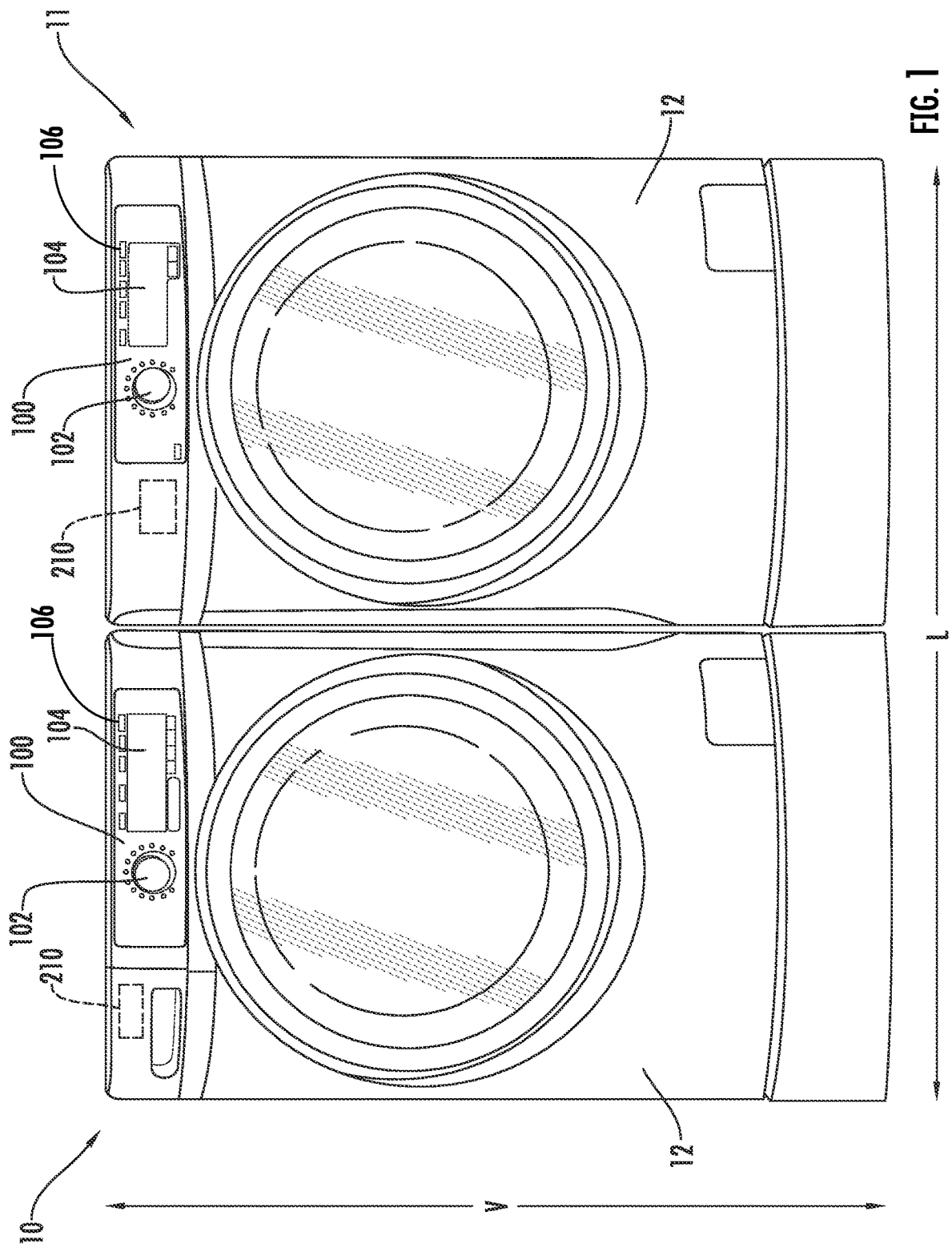
FIG. 1 provides a front view of exemplary laundry appliances in accordance with one or more embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

As may be seen in FIG. 1, in accordance with one or more embodiments of the present subject matter, an appliance 10 (e.g., a laundry appliance 10) having a cabinet 12 is provided. The cabinet 12 defines a vertical direction V, a lateral direction L and a transverse direction T that are mutually perpendicular. The cabinet 12 extends between a top portion and a bottom portion along the vertical direction V. The cabinet 12 also extends between a first side portion and a second side portion, e.g., along the lateral direction L, and a front portion and a back portion, e.g., along the transverse direction T.

In addition, as shown, the appliance 10 includes a user interface 100 and a user input device 102 that may be positioned on an exterior of the cabinet 12. The user input device 102 is generally positioned proximate to the user interface 100, and in some embodiments, the user input device 102 may be positioned on the user interface 100. The appliance 10 may also include features for detecting the presence of a user, as will be described in more detail below.

In various embodiments, the user interface 100 may represent a general purpose I/O ("GPIO") device or functional block. In some embodiments, the user interface 100 may include or be in operative communication with user input device 102, such as one or more of a variety of digital, analog, electrical, mechanical, or electro-mechanical input devices including rotary dials, control knobs, push buttons, and touch pads. The user interface 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, the appliance 10 may also include a controller 210 in operative communication with the user input device 102. The user interface 100 and the user input device 102 may be in communication with the controller 210 via, for example, one or more signal lines or shared communication busses. Input/output ("I/O") signals may be routed between controller 210 and various operational components of the appliance 10. Operation of the appliance 10 can be regulated by the controller 210 that is operatively coupled to the user interface 100. A user interface 100 may, for example, provide selections for user manipulation of the operation of an appliance, e.g., via user input device 102 and/or display 104. In another example, user interface 100 may include a button 106. Button 106 may be a network button, or a disconnect button. In detail, button 106 may be utilized to connect to or disconnect from a wireless network. For example, a local user may press button 106 to establish a wireless network connection with a wireless network. In response to user manipulation of the user interface 100 and/or user input device 102, the controller 210 may operate various components of the appliance 10. Further, the controller 210 may include a memory and one or more microprocessors, CPUs, or the like, such as general or special purpose microprocessors operable to execute programming instructions or micro-control code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, the controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance 10 by executing instructions stored in memory. For example, the instructions may be software or any set of instructions that when executed by the processing device, cause the processing device to perform operations. Moreover, the controller 210 can include one or more processor(s) and associated memory device(s) configured to perform a variety of computer-implemented functions and/or instructions (e.g., performing the methods, steps, calculations and the like and storing relevant data as disclosed herein). It should be noted that the controller 210 as disclosed herein may be capable of and may be operable to perform any methods and associated method steps as disclosed herein.

In some embodiments, for example, as illustrated in FIG. 1, the appliance 10 may be one of a set of two or more appliances. In the embodiment illustrated in FIG. 1, the appliance 10 may be one of a pair of laundry appliances, e.g., the appliance may be a washer 10 and/or dryer 11. In embodiments such as illustrated in FIG. 1, the user input device 102 of each appliance 10 and 11 may be positioned on the user interface 100. The embodiment illustrated in FIG. 1 also includes a display 104 on the user interface. It should be noted that appliance 10 shown in FIG. 1 is merely exemplary, and the disclosure may be applicable to any suitable appliance (e.g., refrigerators, air conditioners, water heaters, microwaves, dishwashers, thermostats, and the like).

Figure 2:
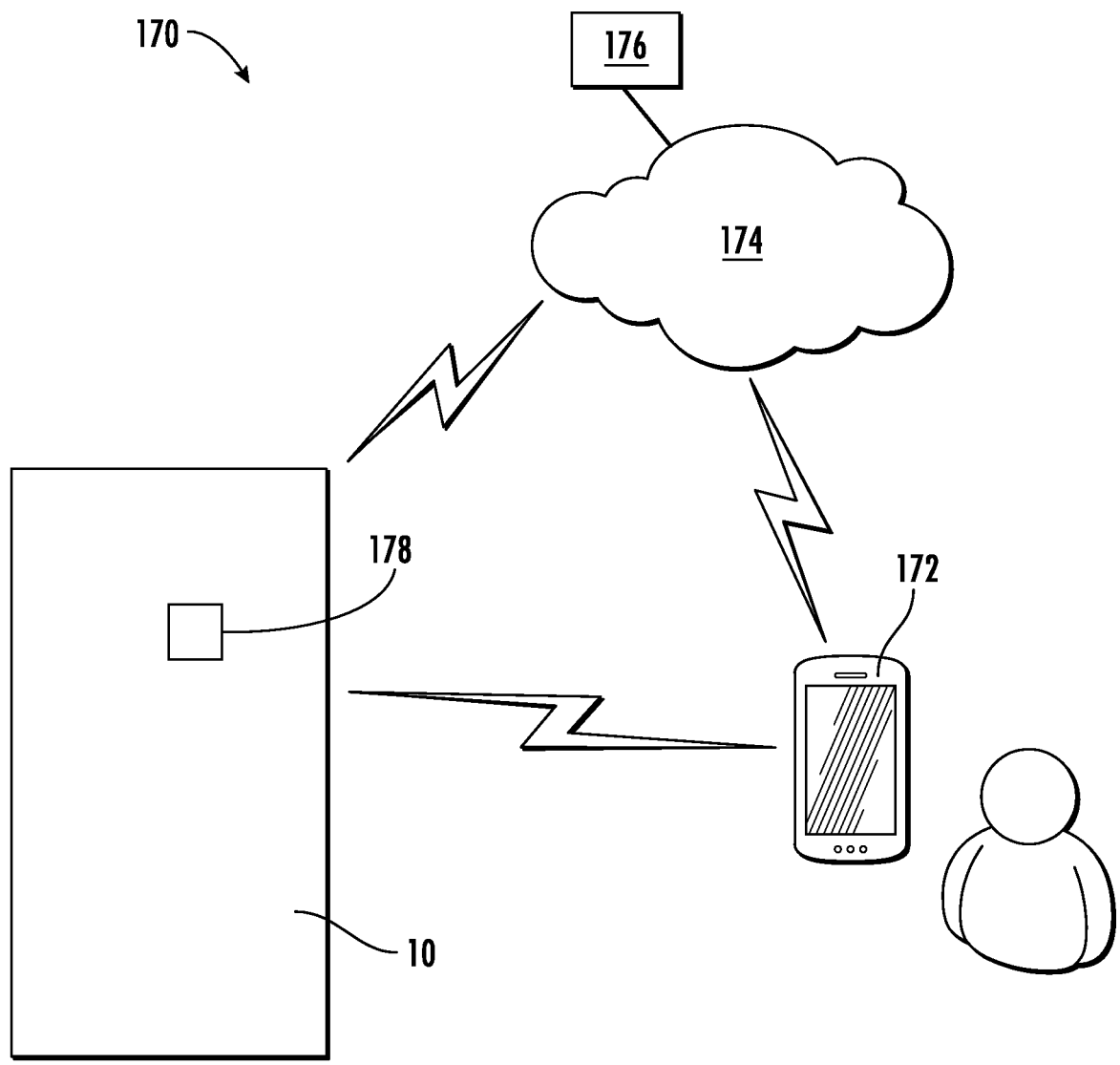
FIG. 2 provides a schematic illustration of an exemplary appliance in communication with a remote user interface device according to one or more embodiments of the present disclosure.

Referring to FIG. 2, a schematic diagram of an external communication system 170 will be described according to an exemplary embodiment of the present subject matter. In general, external communication system 170 is configured for permitting interaction, data transfer, and other communications between appliance 10 and one or more external devices. For example, this communication may be used to provide and receive operating parameters, user instructions or notifications, performance characteristics, user preferences, or any other suitable information for improved performance of appliance 10. In addition, it should be appreciated that external communication system 170 may be used to transfer data or other information to improve performance of one or more external devices or appliances and/or improve user interaction with such devices.

For example, external communication system 170 permits controller 210 of appliance 10 to communicate with a separate device external to appliance 10, referred to generally herein as a unique remote device 172. For example, appliance 10 may include a wireless connection module 178 through which appliance 10 communicates with network 174. As described in more detail below, these communications may be facilitated using a wired or wireless connection, such as via a network 174. In general, unique remote device 172 may be any suitable device separate from appliance 10 that is configured to provide and/or receive communications, information, data, or commands from a user. In this regard, unique remote device 172 may be, for example, a personal phone, a smartphone, a tablet, a laptop or personal computer, a wearable device, a smart home system, or another mobile or remote device.

In addition, a remote server 176 may be in communication with appliance 10 and/or unique remote device 172 through network 174. In this regard, for example, remote server 176 may be a cloud-based server 176, and is thus located at a distant location, such as in a separate state, country, etc. According to an exemplary embodiment, unique remote device 172 may communicate with a remote server 176 over network 174, such as the Internet, to transmit/receive data or information, provide user inputs, receive user notifications or instructions, interact with or control appliance 10, etc. In addition, unique remote device 172 and remote server 176 may communicate with appliance 10 to communicate similar information.

In general, communication between appliance 10, unique remote device 172, remote server 176, and/or other user devices or appliances may be carried using any type of wired or wireless connection and using any suitable type of communication network, non-limiting examples of which are provided below. For example, unique remote device 172 may be in direct or indirect communication with appliance 10 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 3:
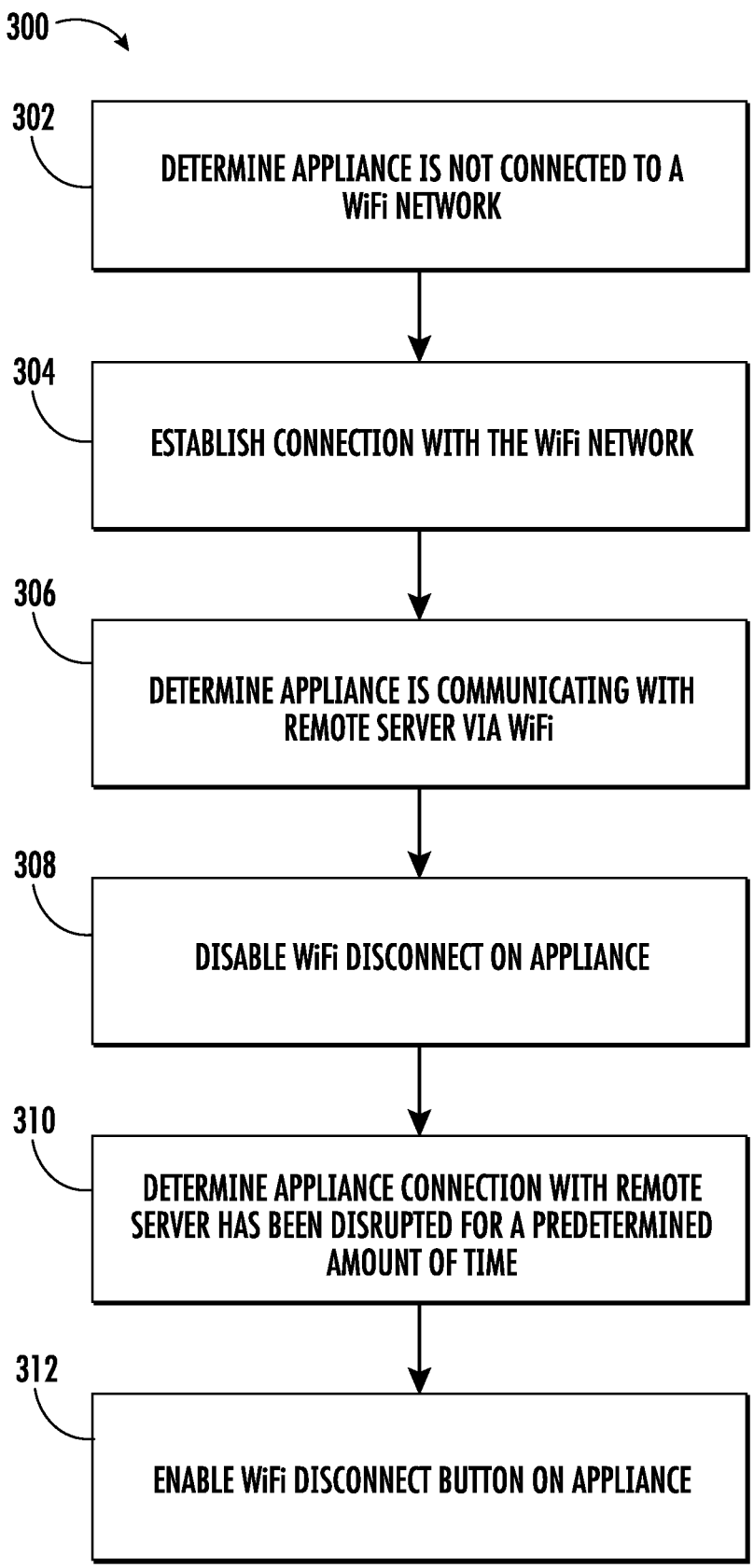
FIG. 3 provides a flow chart illustrating a method of operating an appliance according to one or more embodiments of the present disclosure.

FIG. 3 provides a flow chart illustrating a method 300 of operating an appliance (e.g., appliance 10) according to an exemplary embodiment. It should be noted that method 300 may be applied to any suitable appliance having network connectivity, and the disclosure is not limited to the examples provided herein. At step 302, method 300 may include determining that an appliance (e.g., appliance 10) is not connected to a network, such as a WiFi network. For instance, a controller (e.g., controller 210) may recognize that there is no communication between the appliance and a remote server or unique remote device. In this regard, "no communication" may mean that no signals are exchanged between the appliance and the network, and/or no information is exchanged between the appliance and the unique remote device or remote server.

At step 304, method 300 may include establishing a connection with a network. Upon determining that the appliance is not connected to the network, the appliance may subsequently establish a connection with the wireless network. In some embodiments, a connection (e.g., a WiFi connection) may be established locally (e.g., via a user interface of the appliance). As discussed above, the appliance may include a button, such as a network button or a disconnect button (e.g., button 106). In order to establish the connection, the controller of the appliance may register the button being pressed by a user, such as a local user. After the button is pressed, the controller may initiate a connection with a network, such as a WiFi network, a Local Area Network, or the like. Establishing a connection between an appliance and a network is well understood, and as such, a detailed explanation will be omitted for brevity.

At step 306, method 300 may include determining that the appliance is communicating with a remote server (e.g., remote server 176). In detail, the controller may determine that a connection has been made with a remote server (and subsequently a unique remote device such as unique remote device 172) and that information is being exchanged between the appliance and the unique remote device (and/or the remote server). The controller of the appliance may register the unique remote device within its memory. In detail, the controller may recognize the unique remote device as a master device in communication with the appliance. Accordingly, the controller may determine that the unique remote device may perform various operations with or to the appliance.

At step 308, method 300 may include preventing a local user from disconnecting the appliance from the wireless network. In detail, upon establishing the connection between the appliance and the unique remote device and confirming that the appliance is communicating with the unique remote device, the controller may prevent the local user (e.g., an immediate user in the physical presence of the appliance) from disconnecting the appliance from the wireless network. For instance, the controller may disable the network button located on the user interface of the appliance. Disabling the button may include disconnecting the button from electronically communicating with the controller, or with a wireless connection module provided within the appliance. The disconnection may be a virtual disconnection (e.g., disrupting or restricting communication between the button and the wireless connection module) or a physical disconnection (e.g., preventing the button from being pressed, or preventing the button from making electronic contact with a pad or receiver within the user interface). As another example, the controller of the appliance may ignore an input signal from the button.

In some embodiments, the button is disabled by the unique remote device. In detail, a remote (or non-local) user may interact with the appliance via the remote server and wireless network. The remote user may communicate with the appliance via a software application (e.g., a mobile application). Through the software application, the remote user may input a signal to disable the button on the user interface of the appliance. In alternative embodiments, the controller may automatically disable (or disconnect) the button once the remote connection between the unique remote device and the appliance is confirmed. Additionally or alternatively, the remote user may be notified that the button has been disabled via the software application.

Accordingly, a local user is unable to disconnect the appliance from the wireless network. The remote user (via the unique remote device) may be able to disconnect the appliance from the wireless network through the software application. Thus, the remote user may retain control over the connectivity of the appliance. In some embodiments, the remote user may enable the button via the software application. The remote user may enable the button for a limited time or permanently. Advantageously, the remote user may retain autonomous control over the appliance. For instance, the remote user may be an owner of the appliance while the local user is a temporary user of the appliance (e.g., in a public laundromat).

At step 310, method 300 may include determining that the wireless connection between the appliance and the remote server has been disrupted. In detail, the controller may recognize that communication between the appliance and the remote server (and/or the unique remote device) has been disrupted for a predetermined amount of time. In some examples, the predetermined amount of time may be between one minute and one hour. However, the predetermined amount of time may be set by a user (e.g., the remote user) to any suitable time.

Determining that the communication between the appliance and the remote server has been disrupted may include determining that the wireless connection has been disrupted. For instance, the controller of the appliance may recognize that the appliance is no longer connected to the wireless network. The disconnect from the wireless network may be caused by any suitable means, such as a power outage, a manual disconnect of the wireless network (e.g., switching a wireless router), a change in wireless networks or servers, or the like. Additionally or alternatively, the disconnect from the wireless network may be caused by the unique remote device. For instance, a remote user may register a new unique remote device. Accordingly, the connection between the appliance and the original unique remote device may be broken. In an alternate embodiment, the remote user may sell or otherwise lose possession of the appliance (e.g., to a third party). In this instance, the original unique remote device may be disassociated with the appliance, thus disrupting the communication between the appliance and the unique remote device, and subsequently communication between the appliance and the remote server.

At step 312, method 300 may include enabling the button (e.g., the network or disconnect button) on the user interface of the appliance. In detail, in response to determining that the communication between the appliance and the remote server (and/or the unique remote device) has been disrupted for the predetermined amount of time, the controller of the appliance may enable the button. Accordingly, any local user may again be able to use the button on the user interface to disconnect the appliance from the wireless network. For instance, the appliance may still be connected to a local wireless network (or local area network) while communication with the remote server and/or the unique remote device has been disrupted. In this instance, the button may be enabled such that the local user may disconnect the appliance from the wireless network in order to reconnect to a different wireless network. Additionally or alternatively, the button may be enabled to allow a local user to establish a connection with a wireless network (e.g., the same wireless network or a different wireless network) via the user interface. Advantageously, the appliance is not locked into a connection with a particular wireless network or locked out of connecting to a new wireless network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an appliance, the appliance comprising a user interface and a wireless connection module, the method comprising:
   establishing a wireless connection between the appliance and a wireless network via the wireless connection module;
   determining that the appliance is communicating with a remote server via the wireless connection module in response to establishing the wireless connection;
   preventing a local user from disconnecting the appliance from the wireless connection in response to determining the communication between the appliance and the remote server, wherein preventing the local user from disconnecting the appliance from the wireless connection comprises disabling a disconnect button on the user interface;
   determining that the communication between the appliance and the remote server has been disrupted for a predetermined amount of time; and
   enabling the disconnect button on the user interface for disconnecting the appliance from the wireless connection.

2. The method of claim 1, wherein determining that the communication between the appliance and the remote server has been disrupted comprises determining that the wireless network is no longer available.

3. The method of claim 2, wherein the predetermined amount of time is at least one minute.

4. The method of claim 1, wherein establishing the wireless connection between the appliance and the wireless network comprises establishing a wireless connection between the appliance and a unique remote device.

5. The method of claim 4, wherein the unique remote device comprises a software application, the method further comprising:
   allowing only an input from the software application to disconnect the appliance from the wireless connection.

6. The method of claim 5, further comprising:
   determining that the appliance has been disassociated with the unique remote device; and
   enabling the disconnect button on the user interface for disconnecting the appliance from the wireless connection in response to determining that the appliance has been disassociated with the unique remote device.

7. The method of claim 1, wherein the appliance further comprises a controller in communication with the user interface, and wherein disabling the disconnect button comprises ignoring an input signal from the disconnect button to the controller.

8. The method of claim 1, wherein the appliance is at least one of a laundry machine; a refrigerator; a heating, ventilation, and air conditioner appliance; a cooktop oven; a microwave; a dishwasher; a thermostat; or a water heater.

9. An appliance, comprising:
   a user interface comprising at least one network button for connecting to or disconnecting from a wireless network;
   a wireless connection module provided in the appliance and in communication with the user interface; and
   a controller provided in the appliance and in communication with the user interface and the wireless connection module, the controller configured for performing a series of operations, the series of operations comprising:
      establishing a wireless connection between the appliance and a wireless network via the wireless connection module;
      determining that the appliance is communicating with a remote server via the wireless connection module in response to establishing the wireless connection;
      disabling the network button on the user interface for disconnecting the appliance from the wireless connection in response to determining the communication between the appliance and the remote server;
      determining that the communication between the appliance and the remote server has been disrupted for a predetermined amount of time; and
      enabling the network button on the user interface for disconnecting the appliance from the wireless connection.

10. The appliance of claim 9, wherein determining that the communication between the appliance and the remote server has been disrupted comprises determining that the wireless network is no longer available.

11. The appliance of claim 9, wherein the predetermined amount of time is at least one minute.

12. The appliance of claim 9, wherein establishing the wireless connection between the appliance and the wireless network comprises establishing a wireless connection between the appliance and a unique remote device.

13. The appliance of claim 12, wherein the unique remote device comprises a software application, wherein the series of operations further comprises:
   allowing only an input from the software application to disconnect the appliance from the wireless connection.

14. The appliance of claim 13, wherein the series of operations further comprises:
   determining that the appliance has been disassociated with the unique remote device; and
   enabling the network button on the user interface for disconnecting the appliance from the wireless connection in response to determining that the appliance has been disassociated with the unique remote device.

15. The appliance of claim 9, wherein disabling the network button comprises ignoring an input signal from the network button to the controller.

16. The appliance of claim 9, wherein the series of operations further comprises:
   enabling the network button on the user interface of the appliance via a signal from the remote server.

17. The appliance of claim 9, wherein the appliance is at least one of a laundry machine; a refrigerator; a heating, ventilation, and air conditioner appliance; a cooktop oven; a microwave; a dishwasher; a thermostat; or a water heater.

* * * * *